(12) United States Patent
Ahmad et al.

(10) Patent No.: US 11,513,741 B2
(45) Date of Patent: Nov. 29, 2022

(54) AUTOMATIC VOLUME STATISTICAL AND PERFORMANCE INFORMATION TRACKING

(71) Applicant: International Business Machines Corporation, Armonk, NY (US)

(72) Inventors: Said Ahmad, Tucson, AZ (US); Khanh Vi Ngo, Tucson, AZ (US); David Lee Swanson, Tucson, AZ (US); Illarion Borisevich, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 16/789,569

(22) Filed: Feb. 13, 2020

(65) Prior Publication Data
US 2021/0255811 A1    Aug. 19, 2021

(51) Int. Cl.
| G06F 3/00 | (2006.01) |
| G06F 3/06 | (2006.01) |
| G11B 15/68 | (2006.01) |
| G11B 5/55 | (2006.01) |

(52) U.S. Cl.
CPC .......... *G06F 3/0682* (2013.01); *G06F 3/0604* (2013.01); *G06F 3/0632* (2013.01); *G06F 3/0634* (2013.01); *G11B 5/5508* (2013.01); *G11B 15/689* (2013.01)

(58) Field of Classification Search
None
See application file for complete search history.

(56) References Cited

U.S. PATENT DOCUMENTS

| 6,650,495 | B2 | 11/2003 | Gill et al. | |
| 6,979,139 | B2 * | 12/2005 | Hine | B41J 3/4075 |
| | | | | 400/615.2 |
| 9,015,005 | B1 | 4/2015 | Stripling | |
| 9,483,510 | B2 | 11/2016 | Sitaram et al. | |
| 9,501,348 | B2 | 11/2016 | Foster et al. | |
| 10,573,350 | B2 * | 2/2020 | Abe | G11B 27/107 |

(Continued)

FOREIGN PATENT DOCUMENTS

WO    2004066277 A2    8/2004

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Midys Rojas
(74) *Attorney, Agent, or Firm* — Jared L. Montanaro (57) ABSTRACT

A tape may be mounted into a tape drive. Mounting the tape into the tape drive may include loading the tape from a storage slot. The tape drive may request a first record of the tape from a tape storage subsystem. The tape drive may determine whether the first record of the tape exists in the tape storage subsystem. The tape drive may load the first record of the tape in random access memory (RAM) of the tape drive. The first record may include one or more data entries. The tape drive may append a new data entry to the first record. The first record may be transitioned to a second record upon being appended with the new data entry. The tape may be unmounted from the tape drive.

18 Claims, 6 Drawing Sheets

(56) References Cited

U.S. PATENT DOCUMENTS 10,621,065 B2 * 4/2020 Nylander-Hill ..... G06F 11/3485
2007/0050569 A1 3/2007 Haustein et al.

OTHER PUBLICATIONS

Oracle, "Oracle's StorageTek SL3000 Modular Library System: Clearly Superior to Quantum—At a Lower Cost", An Oracle White Paper, Aug. 2012. 17 pgs.

* cited by examiner

AUTOMATIC VOLUME STATISTICAL AND PERFORMANCE INFORMATION TRACKING

BACKGROUND

The present disclosure relates generally to the field of tape storage, and more specifically to automatically identifying the condition of a tape cartridge before full degradation of the tape cartridge.

Tape libraries store thousands of tape cartridges, which, on a day-to-day basis are mounted to tape drives, have operations performed on them by the tape drives, and are then unmounted from the tape drives. With each mount a potential footprint consisting of performance and statistical data, which is needed for a volume Statistical Analysis and Reporting System, can be accumulated and stored on the tape. However, due to Linear Tape Open (LTO) Format Specifications, it is currently impossible to store such data on tape of an LTO tape cartridge.

SUMMARY

Embodiments of the present disclosure include a method, computer program product, and system for automatically identifying the condition of a tape cartridge before full degradation of the tape cartridge. A tape may be mounted into a tape drive. Mounting the tape into the tape drive may include loading the tape from a storage slot. The tape drive may request a first record of the tape from a tape storage subsystem. The tape drive may determine whether the first record of the tape exists in the tape storage subsystem. The tape drive may load the first record of the tape in random access memory (RAM) of the tape drive. The first record may include one or more data entries. The tape drive may append a new data entry to the first record. The first record may be transitioned to a second record upon being appended with the new data entry. The tape may be unmounted from the tape drive.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of tape storage, and more specifically to automatically identifying the condition of a tape cartridge before full degradation of the tape cartridge. It should be noted that throughout the present disclosure, a "tape drive" is a system that utilizes tape to store information, further noted is that a "tape cartridge" is defined a structure that house "tape" which is defined as a flexible magnetic tape medium. While the present disclosure is not necessarily limited to such applications, various aspects of the disclosure may be appreciated through a discussion of various examples using this context.

Tape libraries store thousands of tape cartridges, which, on a day-to-day basis are mounted to tape drives, have operations performed on them by the tape drives, and are then unmounted from the tape drives. With each mount a potential footprint consisting of performance and statistical data, which is needed for a volume Statistical Analysis and Reporting System, can be accumulated and stored on the tape. Statistical analysis and reporting system information is important to tape technology because it determines whether read and write errors are being caused by a media (e.g., tape) or the hardware in a tape drive. However, due to Linear Tape Open (LTO) Format Specifications, it is currently impossible to store such data on tape of an LTO tape cartridge. Accordingly, it may be desirable to have a way to bring volume Statistical Analysis and Reporting System to LTO technology/media/etc.

In order to have volume Statistical Analysis and Reporting System for LTO media without violating LTO Format Specifications, there remains a need to have a way to store the necessary data for volume Statistical Analysis and Reporting System within a tape storage subsystem. In some embodiments, the volume Statistical Analysis and Reporting System data could be stored in a tape library, which is where tape cartridges reside. In some, or other embodiments, the data could be stored on a server that is connected to (e.g., a part of) the tape storage subsystem. Having the tape storage subsystem store the data required for volume Statistical Analysis and Reporting System is beneficial for all media types: past, present, and future, to be able to have a record of the media's usage and health. Disclosed herein is a method, system, and computer program product that details when a tape cartridge is mounted into a tape drive, the tape drive can request a (e.g., first, original, etc.) record of that tape's volume Statistical Analysis and Reporting System from the tape storage subsystem (and if no record exists, a new record is generated), and append a new entry of performance and statistical data onto the record throughout the duration of the mount. Further disclosed herein is when the tape is unmounted, the tape drive can upload the updated (e.g., new, second, etc.) record (e.g., the record with the appended entry) to the tape storage subsystem where the updated record can be saved in nonvolatile memory until it is accessed again by the remounting of the same tape/tape cartridge. In such a way, there may be a volume Statistical Analysis and Reporting System record for each tape cartridge in the tape storage subsystem that has ever been mounted on a tape drive associated with the tape storage subsystem.

It is noted, that as mentioned before, there is no current way to keep track of performance and statistical data of LTO media (e.g., tape cartridges) for the duration of a tape's life cycle. Thus, as disclosed, the advantage of being able to utilize the performance and statistical data for LTO media creates the ability to proactively notify a user as to when an LTO media is degrading and should be replaced rather to save data rather than identifying that the media is too degraded to be able to transfer data to a new housing (e.g., and effectively permanently losing data/information). Further, as disclosed, the data is not limited to a single environment; because the data is stored in the tape storage subsystem, it can be exported from an old storage subsystem and imported into a new environment when a tape cartridge is moved to a new storage subsystem. That is, if the tape storage subsystem is failing before an LTO media, the data related to the volume Statistical Analysis and Reporting System can be transferred to a new tape storage subsystem so that the new tape storage subsystem knows the entire life history of each LTO media being brought into its environment.

Accordingly, in some embodiments, a tape (e.g., included in a tape cartridge) may be mounted into a tape drive. Mounting the tape into the tape drive may include loading the tape from a storage slot. The tape drive (e.g., a processor of the tape drive, a tape storage subsystem, etc.) may request a first record of the tape from a tape storage subsystem. The tape drive may determine whether the first record of the tape exists in the tape storage subsystem. The tape drive may load the first record of the tape in random access memory (RAM) of the tape drive. The first record may include one or more data entries (e.g., entries related to each mounting of the tape inside a particular tape environment). The tape drive may append a new data entry to the first record. The first record may transition to a second record upon being appended with the new data entry. The tape may be unmounted from the tape drive.

For instance, a LTO tape cartridge may be inserted into a tape drive that is a part of a tape library, the tape drive may then access a tape within the tape cartridge and identify (e.g., from an identifier embedded within the tape) which tape/tape cartridge has been inserted. The tape drive may then communicate with the tape library and ask for a record associated with the identified tape/tape cartridge. This record may include the historical statistical and performance data of the tape/tape cartridge during all previous mountings. The tape drive may then run diagnostics, e.g., Statistical Analysis and Reporting System algorithms, on the tape/tape cartridge and append its findings on the record provided by the tape library. The record with the appendage may then be stored back within the tape library (which can then be loaded during further subsequent mountings of the identified tape/tape cartridge) and the tape cartridge may then be unmounted.

In some embodiments, when determining whether the first record of the tape exists in the tape storage subsystem, the tape drive may identify that the first record does exist in the tape storage subsystem. The tape drive, or in some embodiments, the tape storage subsystem, may then generate the new data entry. The new data entry may be populated with vital data that may include volume statistical information and performance information of the tape/tape cartridge during the mounting of the tape. In some embodiments, the vital data may be constantly updated (e.g., every 5 seconds, every 30 seconds, every minute, etc.) while the tape is mounted. In some embodiments, the vital data may be updated based on particular events (e.g., a particular threshold in regard to tape health is met, etc.).

In some embodiments, the tape drive may send the second record (e.g., the record with the appended [new] entry) with an associated unique identifier to the tape storage subsystem. The tape storage subsystem may delete the first record (and/or the first record may be deleted from the RAM of the tape drive). The tape storage subsystem may record the second record in place of the first record. The tape storage system may then generate a health report of the tape/tape cartridge. The tape storage system may display the health report to a user. In some embodiments, the associated unique identifier may have already been generated and associated with a specific, single tape/tape cartridge if the tape/tape cartridge had previously been mounted/loaded into a tape drive connected to/a part of the tape storage subsystem. In other embodiments, the associated unique identifier may be generated and associated with a specific, single tape/tape cartridge if the tape/tape cartridge is being mounted/loaded into a tape drive connected to/a part of the tape storage subsystem for a first time.

For example, a new record with appended information detailing a tape's current/most recent mounting may be sent to a server (e.g., the tape storage subsystem) for storage, the server may find the first record of the tape by identifying an identifier that is associated (e.g., embedded in a header, etc.) in the tape data and locating the first record that has the corresponding/same identifier. The server may delete the first record and replace it with the new record. Further the server may analyze the new record and determine if the tape (based on a Statistical Analysis and Reporting System algorithm) is working properly or not. The server may forward a report of if the tape is working properly or not to a user. In some embodiments, if it is identified in the report that the tape is not working properly, the user may take corrective action, such as moving data from the (deteriorating) tape to a newer, more secure tape. In some embodiments, if it is identified that the tape is not working properly, the server may automatically copy, or move, the data of the tape before it is unmounted to a secure environment, for example, a new tape, flash memory until a new storage medium can be obtained, in the cloud, etc. In some embodiments, if it is identified that the tape is not working properly, the server may not perform any actions until the user confirms a course-of-action to take, e.g., the user affirmatively clicks an option presented in the health report, etc.

In some embodiments, the tape drive (or, in some embodiments, the tape storage subsystem) may maintain the first record in its RAM. The tape drive may identify that the tape has been remounted. The tape drive may access the first record from the RAM of the tape drive and the second record from the tape storage subsystem (or, vice versa). The tape drive may replace the first record in the RAM of the tape drive with the second record. The tape drive may replace the second record in the tape storage subsystem with a third record. The third record may be the second record appended with vital data associated with the remount.

That is, a tape may have been mounted/loaded into a tape drive at a first instance and a first record may have been generated. The tape may have then been unmounted and at a second instance the tape may have been remounted/ reloaded for use and the first record may have been updated/appended with information regarding the remount, thus transitioning the first record into a second record. The tape may have been unmounted again and at a third instance the tape may have been remounted for use and the second record may have been updated with information regarding the second remount, thus transitioning the second record into a third record. It is noted that each mounting/loading of a tape may be recording and each prior record may be transitioned to a successor record for as many times as the tape is mounted/remounted (e.g., first record, second record, . . . N record).

In some embodiments, when determine whether the first record of the tape exists in the tape storage subsystem, the tape drive may identify that the first record does not exist in the tape storage subsystem. The tape drive may generate the first record of with the new data entry. The new data entry may be populated with vital data that includes the volume statistical information and the performance information of the tape during the mounting of the tape. That is, in such an embodiment described above, a new tape that has not been previously mounted/loaded into a tape drive connected to a particular tape storage subsystem may have a record generated (with an associated unique identifier) for it and vital data may be simultaneously incorporated into the record without appendage.

In some embodiments, the tape drive may send the first record with an associated unique identifier to the tape storage subsystem. The tape drive may record the first record in the tape storage subsystem. The tape storage subsystem may generate a health report of the tape cartridge. The tape storage subsystem may display the health report to a user.

In some embodiments, when recording the first record in the tape storage subsystem, the first record may be virtualized in the tape storage subsystem. In such a scenario, the tape storage subsystem may be/include a tape library. The first record may then be removed from the (RAM) of the tape drive.

For example, tape drives "A" and "B," may query a tape library "L" for Statistical Analysis and Reporting System data (e.g., vital data of a record) for their respective selves, e.g., vital data regarding tape drives "A" and "B." This may be done because the tape drives "A" and "B" do not natively maintain their respective Statistical Analysis and Reporting System data.

Given such a scenario, tape drives "A" and "B" may utilize the tape library "L" to virtualize their respective Statistical Analysis and Reporting System data, prior records, vital data, etc. Tape drives "A" and "B" are then able to update their new entries at a lessened computing cost as opposed to natively accessing non-volatile memory (ROM, etc.). Further, in some embodiments, the tape drives "A" and "B" (and any other tape drives) may be simultaneously loaded/mounted with tapes/tape drives and may simultaneously be able to access the virtualized data from the tape library "L."

Figure 1:
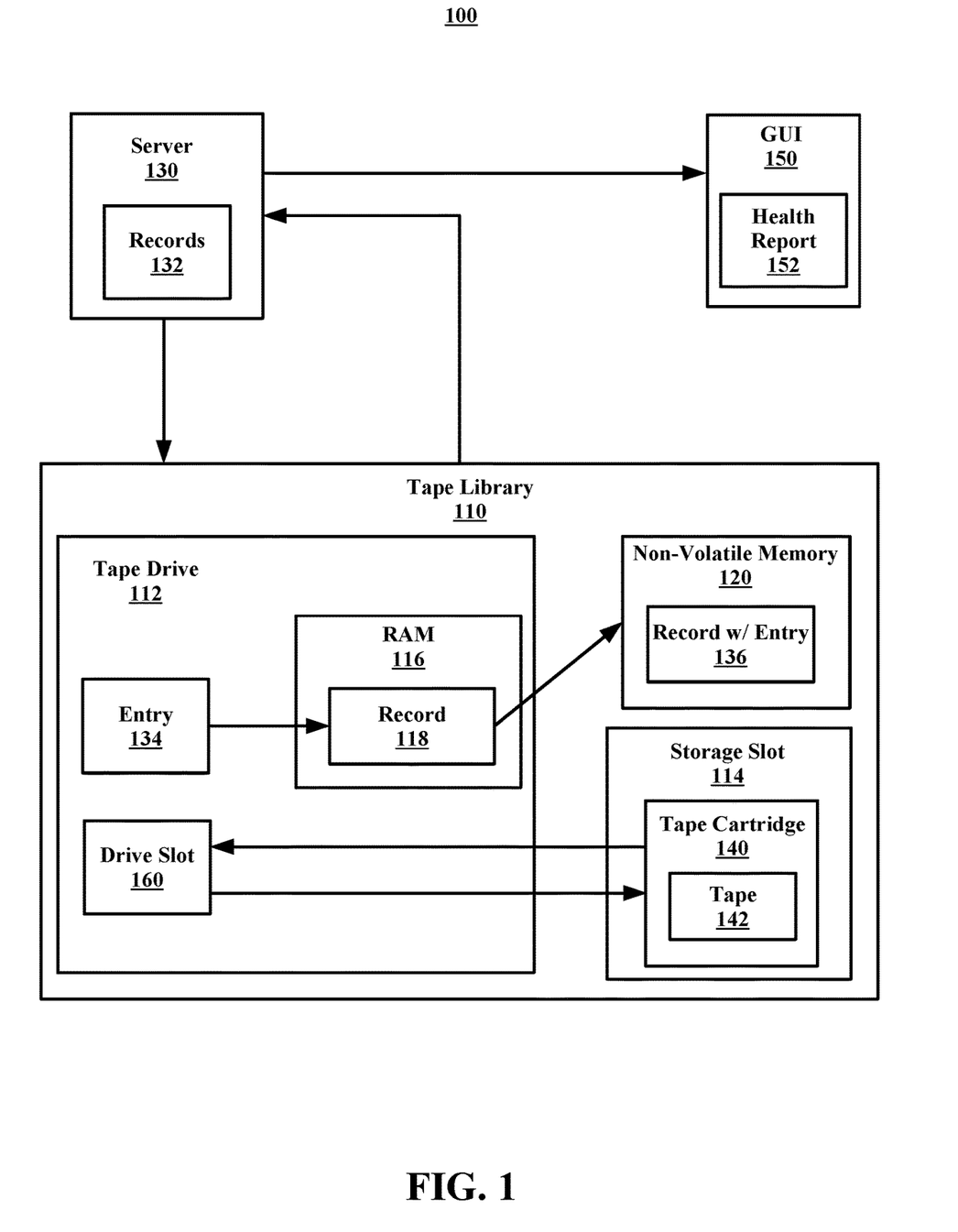
FIG. 1 illustrates an example system for generating a health report of a tape cartridge, in accordance with embodiments of the present disclosure.

Referring now to FIG. 1, illustrated is an example system 100 for generating a health report 152 of a tape cartridge 140, in accordance with embodiments of the present disclosure. In some embodiments, the system 100 includes a tape library 110, a server 130, and a graphical user interface (GUI) 150. In some embodiments, the server 130 or the tape library 110 may act as the tape storage subsystem described throughout this disclosure. In other embodiments, both the server 130 and the library 110 may simultaneously act as the tape storage subsystem.

In some embodiments, the server 130 includes records 132 (e.g., a first record, a second record, etc.) for each tape/tape cartridge loaded/mounted in the system 100 and which may include new entries (e.g., vital data regarding subsequent mounts/loads of the tape cartridge 140/a tape 142), and the GUI 150 includes a health report 152 (e.g., for the tape cartridges 140/of the tape 142).

In some embodiments, the tape library 110 includes a storage slot 114 that houses a tape cartridge 140 when the tape cartridge 140 is not in use. Further, the tape cartridge 140 includes tape 142. In some embodiments, the tape library 110 further includes a tape drive 112 that includes RAM 116 that includes a record 118 that is related (by an associated, unique identifier) to the tape cartridge 140 and/or the tape 142, and which may be pulled/forwarded from the records 132 of the server 130. The tape drive 112 further includes an entry 134 that details vital (e.g., Statistical Analysis and Reporting System) data related to the mounting of the tape cartridge 140. In some embodiments, the tape drive 112 includes a drive slot 160 that allows for the mounting of the tape cartridge 140. In some embodiments, the tape library 110 additionally includes non-volatile memory 120 that may permanently store a record with an appended entry 136.

In some embodiments, the record with the appended entry 136 may be the record 118 appended with the entry 134. Further, the record with the appended entry 136 may be permanently pushed and stored in the server 130 with the other records 132. It is noted that the term "permanently" indicates that the record with the appended entry 136 may be stored until another mount/load of the tape cartridge 140/tape 142. In some embodiments, once the record with the appended entry 136 is stored in the non-volatile memory 120 and/or the server 130, the tape library 110 may generate the health report 152 and display the health report 152 to a user via the GUI 150.

It is noted that, in some embodiments, a respective record (e.g., records 132, record 118, and/or record with the appended entry 136) may be a data structure used to keep volume Statistical Analysis and Reporting System data for each respective tape cartridge (e.g., 140) in the tape library 110. The data structure is a self-describing data block consisting of a tiered first-in-first-out (FIFO) queue where new data (e.g., the entry 134) is appended to the end of a record and the oldest data (e.g., a prior entry) is removed from the record 118 when storage space needs to be created. In such an implementation, the queue will have two or more priority tiers. That is, some of the entries may not be removed depending on the priority of the entry associated with the tape cartridge 140/tape 142 (e.g., if a tape is designated as having "important" information, the system 100 may never delete an entry of the tape as to have a complete track record of the health of the tape, etc.).

In some embodiments, storing records (e.g., the records 132 and/or the record with the entry 136) requires a tape storage subsystem (e.g., the server 130 and/or the tape library 110) with enough space on its nonvolatile memory (e.g., 120) to hold the records (e.g., 132) for each tape cartridge (e.g., 140). In some embodiments, the content of the record (e.g., 118) associated with a mounted tape cartridge 140/tape 142 is abstracted (e.g., virtualized) from the storage subsystem, except for a summarized report and a unique identifier for the record (e.g., likely the volume serial number). The storage subsystem is able to send the content of the record to the tape drive 112 when requested and store the content again (e.g., the record with the appended entry 136) when sent back by the tape drive 112, and replacing the previous version of the record if one exists (e.g. replacing the record 118 in the records 132 with the record with the appended entry 136).

In some embodiments, when a tape cartridge 140 is mounted into the drive slot 160 of the tape drive 112, the tape cartridge 140 will trigger the tape drive 112 (or the tape library 110) to request the record 118 for the tape cartridge 140 from the tape storage subsystem (e.g., as depicted in this case, the server 130). Further, the tape drive 112 will save the record 118 in its RAM 116. The tape drive 112 will then perform (Statistical Analysis and Reporting System) analysis on the tape cartridge 140/tape 142 and generate a (new) entry 134 for the current mount. In some embodiments, if the storage subsystem has no record for the tape cartridge 140 then the tape drive 112 generates a new record (e.g., 118) in the RAM 116 and populates the queue (and/or record 118) with the entry 134. When the tape cartridge 140 is unmounted from the drive slot 160 of the tape drive 112, the tape drive 112 will send the record with the appended entry 136 to the tape storage subsystem for storage. In some embodiments, the record with the appended entry 136 remains in the RAM 116 until another cartridge is mounted into the drive.

In some embodiments, using the record with the appended entry 136, the tape storage subsystem will generate a visual of the health report 152 of the tape cartridge 140 and display the health report 152 to a user. It is noted that in some embodiments, the health status of the tape 142 is updated at each unmount of the tape cartridge 140 when the record with the appended entry 136 is sent to the tape storage subsystem for storage.

Figure 2:
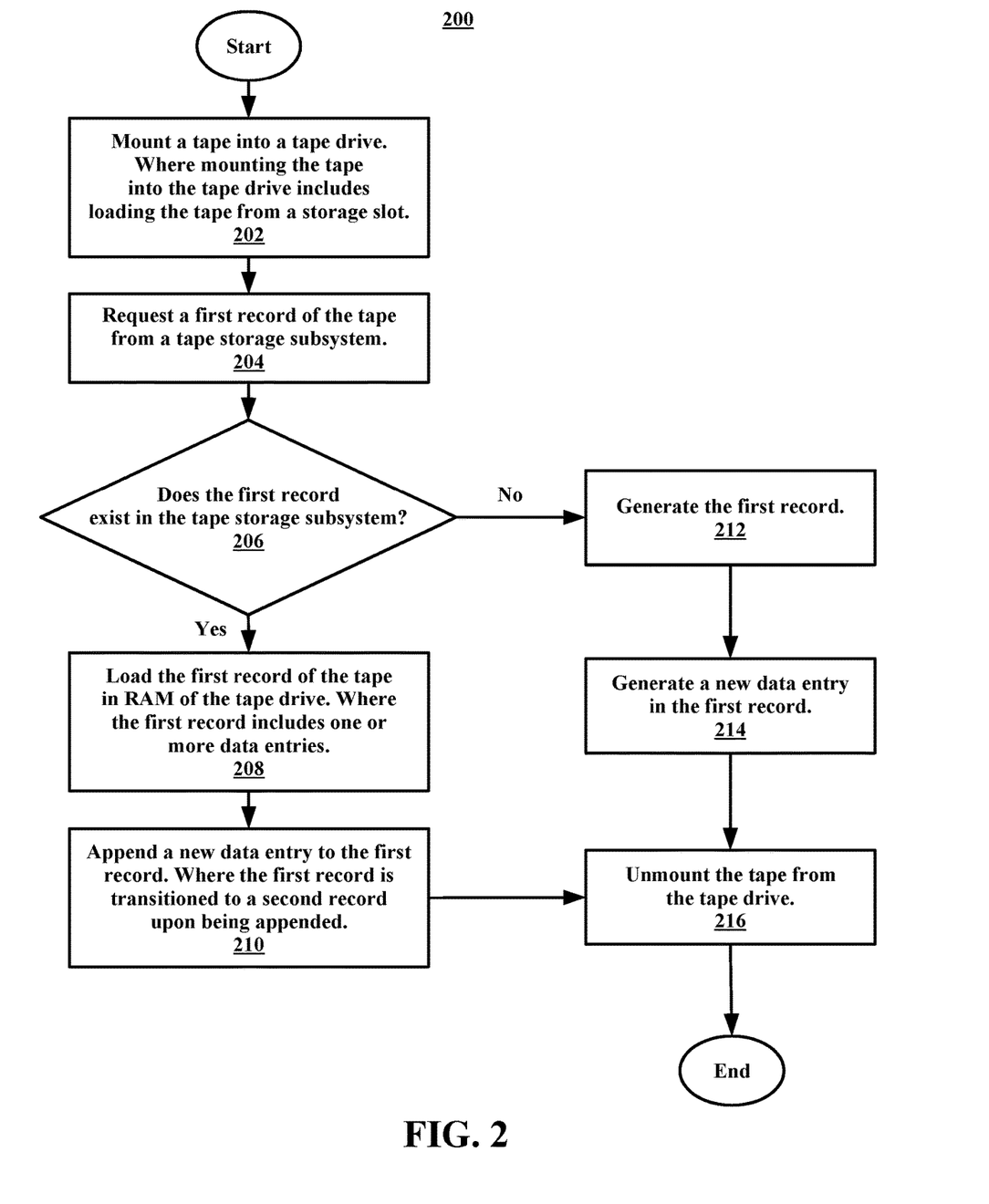
FIG. 2 illustrates a flowchart of an example method for generating a first record associated with a tape of a tape cartridge, in accordance with embodiments of the present disclosure.

Referring now to FIG. 2, illustrated is a flowchart of an example method 200 for generating a first record associated with a tape of a tape cartridge, in accordance with embodiments of the present disclosure. In some embodiments, the method 200 may be performed by a processor (e.g., of a tape drive, of a tape storage subsystem, of a tape library, etc.).

In some embodiments, the method 200 begins at operation 202. At operation 202, a tape is mounted into a tape drive. The mounting of the tape includes the processor loading the tape from/in a storage slot. The method 200 proceeds to operation 204, where the processor requests a first record of the tape from a tape storage subsystem.

The method 200 proceeds to decision block 206, where it is determined whether or not the first record exists in the tape storage subsystem. If, at decision block 206, it is determined that the first record does exist, the method 200 proceeds to operation 208. At operation 208, the processor loads the first record of the tape in RAM of the tape drive. The first record includes one or more data entries. The method 200 proceeds to operation 210, where the processor appends a new data entry to the first record. The first record is then transitioned to a second record upon being appended. The method proceeds to operation 214, where the tape is unmounted from the tape drive. In some embodiments, after operation 214, the method 200 ends.

In some embodiments, if, at decision block 206, it is determined that the first record does not exist, the method 200 proceeds to operation 212. At operation 212, the processor generates the first record. In some embodiments, the method 200 proceeds to operation 214, where the processor generates a new data entry in the first record. The new entry may include vital data associated with the tape.

In some embodiments, the first record is simultaneously generated with the new data entry/vital (e.g., Statistical Analysis and Reporting System) data incorporated. That is, operations 212 and 214 are performed at the same time. In some embodiments, the method 200 proceeds to operation 216, where the tape is unmounted from the tape drive. In some embodiments, after operation 216, the method 200 ends.

Figure 3:
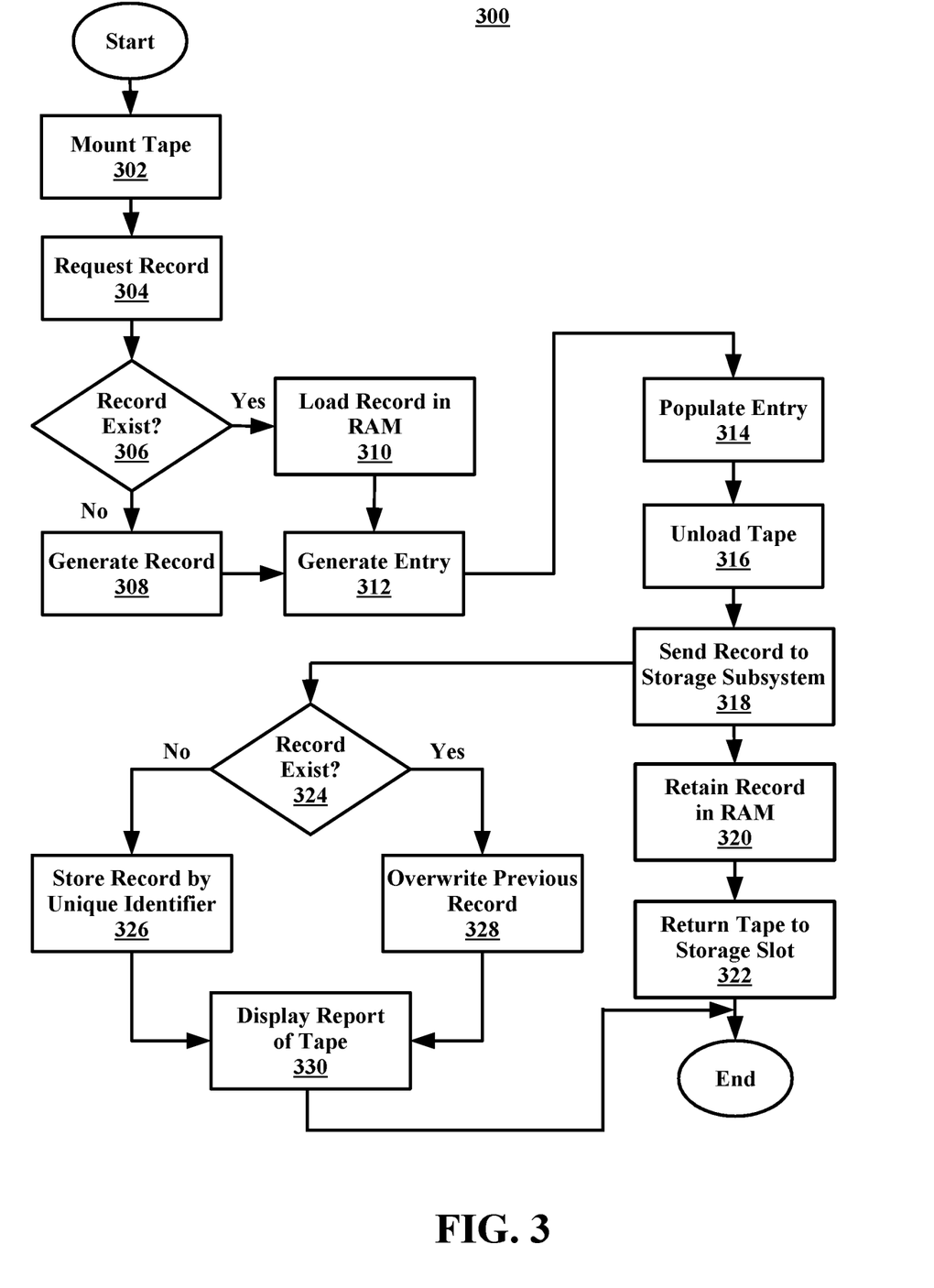
FIG. 3 illustrates a flowchart of an example method for generating a health report of a tape cartridge, in accordance with embodiments of the present disclosure.

Referring now to FIG. 3, illustrated is a flowchart of an example method 300 for generating a health report of a tape cartridge, in accordance with embodiments of the present disclosure. In some embodiments, the method 300 may include/incorporate elements found within both the system 100 of FIG. 1 and the method 200 of FIG. 2. In some embodiments, the method 300 may be performed by a processor (e.g., of a tape drive, of a tape storage subsystem, of a tape library, etc.).

In some embodiments, the method 300 begins at operation 302, where a tape/tape cartridge is loaded/mounted into a tape drive. The method 300 proceeds to operation 304, where the tape drive requests a record of the tape/tape cartridge from a tape storage subsystem. The method 300 proceeds to decision block 306, where it is determined whether or not the (requested) record exists.

If, at decision block 306 it is determined that the record does not exist, the method 300 proceeds to operation 308, where the record (e.g., a new record) is generated (e.g., created, initialized) for the tape/tape cartridge. If, at decision block 306 it is determined that the record does exist, the method 300 proceeds to operation 310, where the record is loaded in RAM of the tape drive. Regardless of the determination made at decision block 306, after either operation 308 or 310, the method 300 proceeds to operation 312.

At operation 312, a new entry (e.g., including vital data, Statistical Analysis and Reporting System data, etc.) is generated in the record. The method 300 proceeds to operation 314, where, throughout the duration of the mount of the tape/tape cartridge, the new entry is populated with the vital data. The method 300 proceeds to operation 316 where the tape/tape cartridge is unloaded/unmounted from the tape drive.

The method 300 proceeds to operation 318, where the record (with the new entry) is sent to the tape storage subsystem. In some embodiments, the method 300 simultaneously proceeds to operation 320 and decision block 324. At operation 320, the record (with the new entry) is retained in the RAM of the tape drive (e.g., until a different tape is loaded and/or the same tape is reloaded at a later time). The method 300 proceeds to operation 322, where the tape is returned back to a storage slot (and the tape cartridge is then unmounted from the tape drive). In some embodiments, the method 300 ends after operation 322.

At decision block 324, it is determined whether or not the record exists in the tape storage subsystem. If, at decision block 324, it is determined that the record does not exist, the method 300 proceeds to operation 326. At operation 326, the tape storage subsystem records the record via a unique identifier (e.g., that is associated with the load/mounted tape/tape cartridge). If, at decision block 324, it is determined that the record does exist, the method 300 proceeds to operation 328. At operation 328, the tape storage subsystem overwrites any previous record with the (updated) record (e.g., the record with the appended new entry).

In some embodiments, after either operation 326 or 328, the method 300 proceeds to operation 330. At operation 330, the tape storage subsystem generates and displays a health report of the tape/tape cartridge, based on a summary of the record, to a user. In some embodiments, operation 326 may be performed simultaneously with operation 308 (e.g., the unique identifier may be generated when the record is generated). In some embodiments, after operation 330, the method 300 ends.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
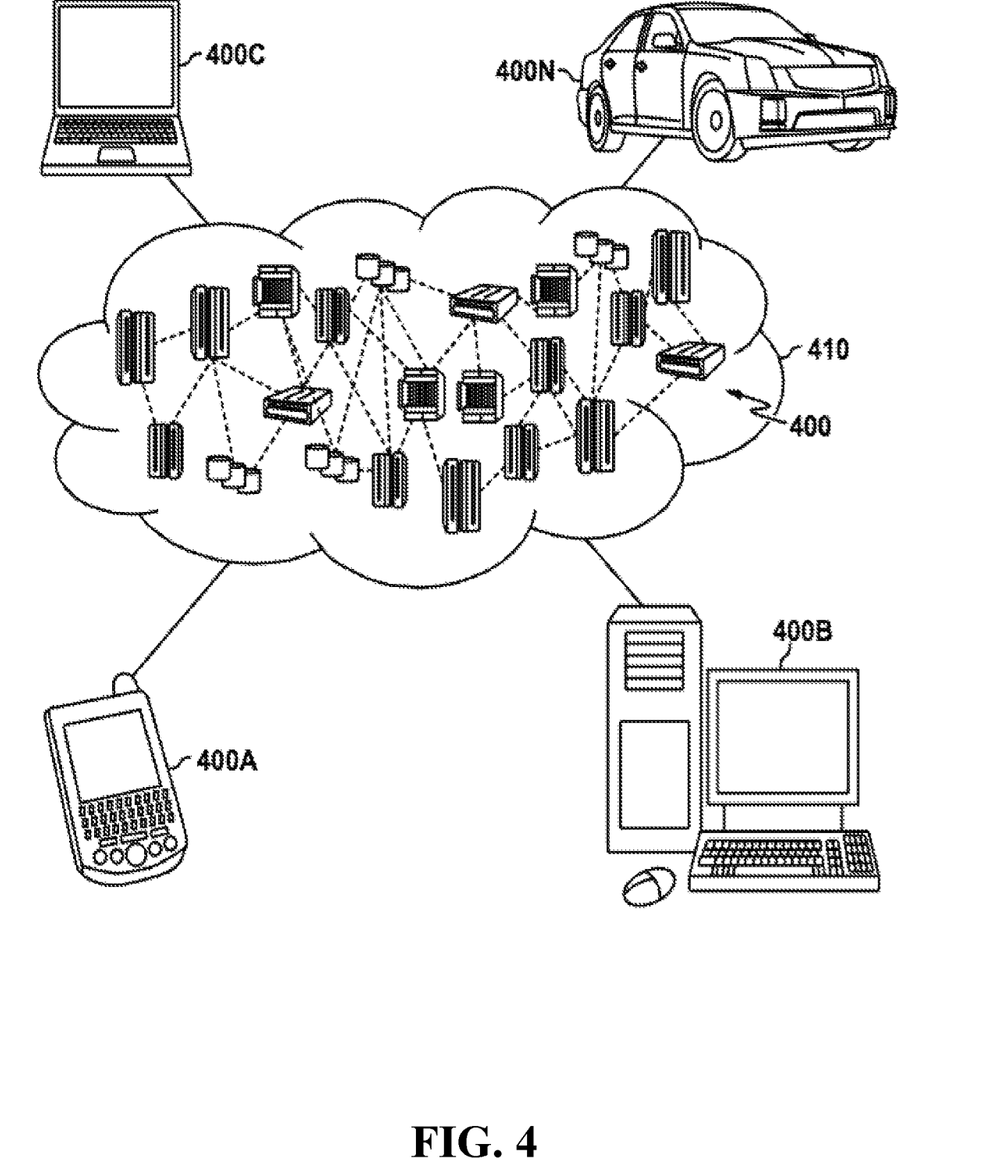
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
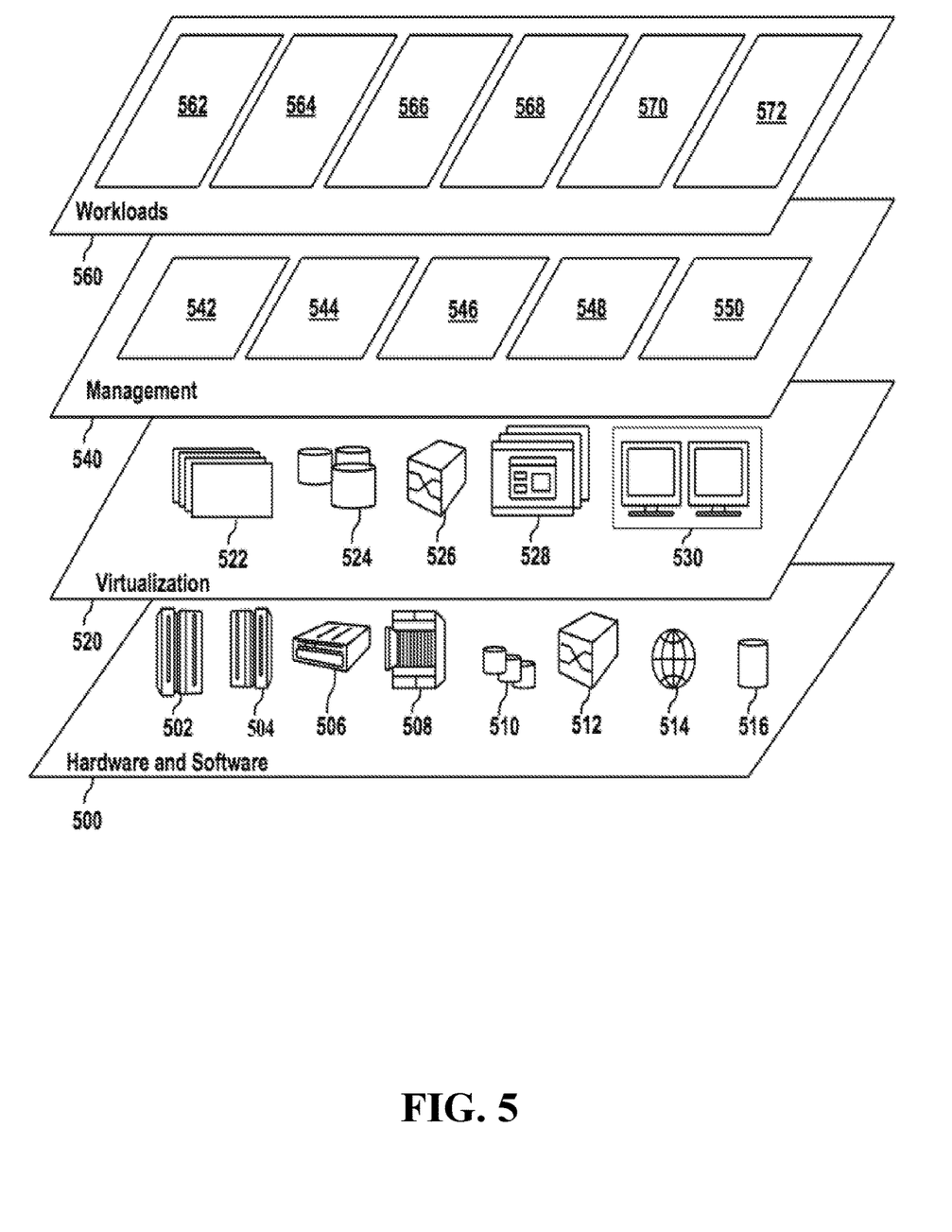
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and statistical/performance data understanding 572.

Figure 6:
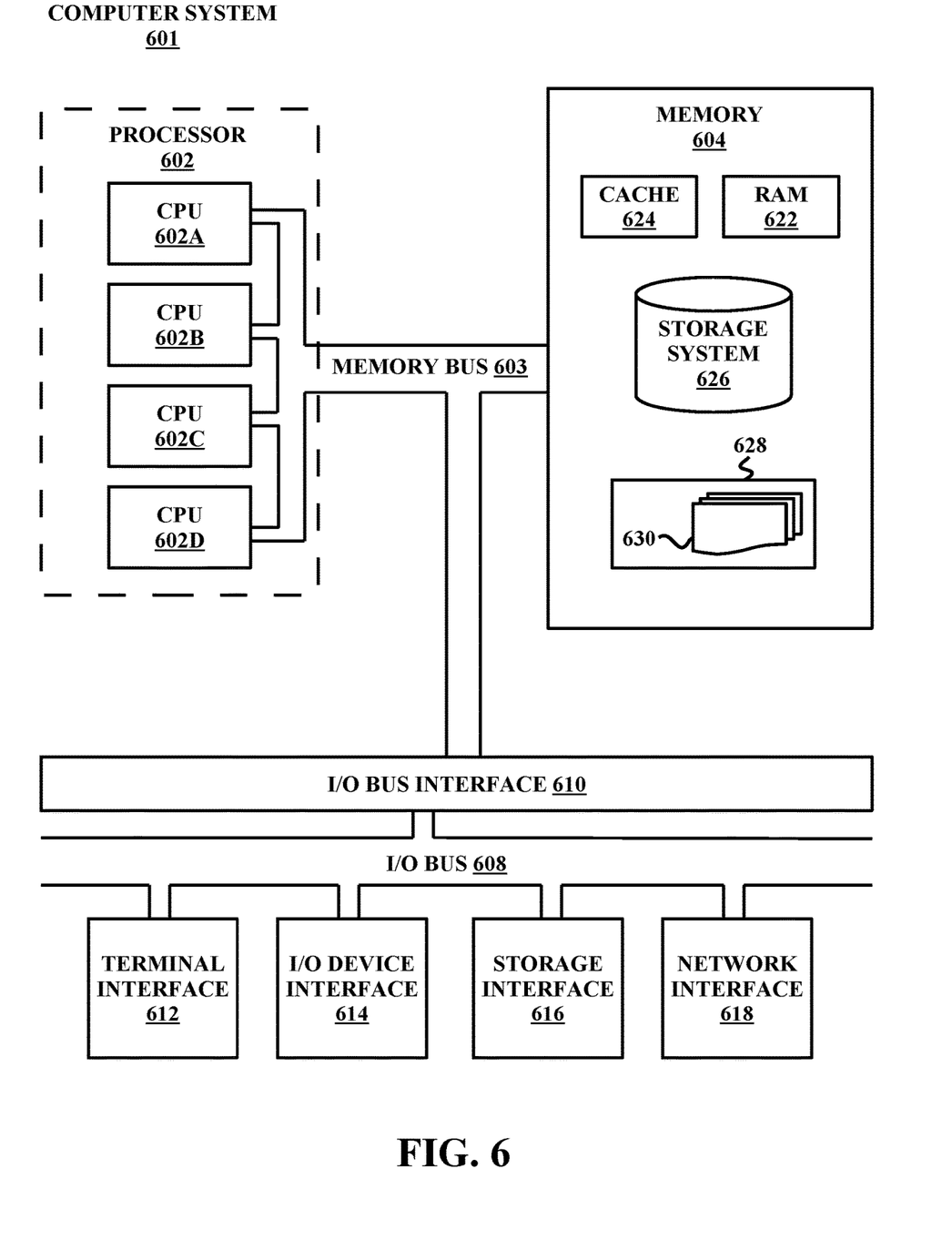
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for tracking volume statistical information and performance information of a tape cartridge in a tape storage subsystem, wherein the tape cartridge includes a tape, the method comprising:
   mounting the tape into a tape drive, wherein mounting the tape into the tape drive includes loading the tape from a storage slot;
   requesting, by the tape drive, a first record of the tape from the tape storage subsystem;
   determining whether the first record of the tape exists in the tape storage subsystem;
   loading the first record of the tape in random access memory (RAM) of the tape drive, wherein the first record includes one or more data entries;
   appending a new data entry to the first record, wherein the first record is transitioned to a second record upon being appended with the new data entry, and wherein the second record includes life history of the tape;
   unmounting the tape from the tape drive; and
   mounting the tape into a new tape drive of a new tape storage subsystem.

2. The method of claim 1, wherein determining whether the first record of the tape exists in the tape storage subsystem comprises:
   identifying that the first record does exist in the tape storage subsystem; and
   generating the new data entry, wherein the new data entry is populated with vital data, wherein the vital data includes the volume statistical information and the performance information of the tape during the mounting of the tape.

3. The method of claim 2, further comprising:
   sending the second record with an associated unique identifier to the tape storage subsystem;
   deleting the first record from the tape storage subsystem;
   recording the second record in place of the first record in the tape storage subsystem;
   generating, by the tape storage subsystem, a health report of the tape cartridge; and
   displaying the health report to a user.

4. The method of claim 3, further comprising:
   maintaining the first record in the RAM of the tape drive;
   identifying that the tape has been remounted;
   accessing the first record from the RAM of the tape drive and the second record from the tape storage subsystem;
   replacing the first record in the RAM of the tape drive with the second record; and
   replacing the second record in the tape storage subsystem with a third record, wherein the third record is the second record appended with vital data associated with the remount.

5. The method of claim 1, wherein determining whether the first record of the tape exists in the tape storage subsystem comprises:
   identifying that the first record does not exist in the tape storage subsystem; and
   generating the first record with the new data entry, wherein the new data entry is populated with vital data, wherein the vital data includes the volume statistical information and the performance information of the tape during the mounting of the tape.

6. The method of claim 5, further comprising:
   sending the first record with an associated unique identifier to the tape storage subsystem;
   recording the first record in the tape storage subsystem;
   generating, by the tape storage subsystem, a health report of the tape cartridge; and
   displaying the health report to a user.

7. A system comprising:
   a memory; and
   a processor in communication with the memory, the processor executing instructions contained within the memory in order to perform operations comprising:
   mounting the tape into a tape drive, wherein mounting the tape into the tape drive includes loading the tape from a storage slot;
   requesting a first record of the tape from the tape storage subsystem;
   determining whether the first record of the tape exists in the tape storage subsystem;
   loading the first record of the tape in random access memory (RAM) of the tape drive, wherein the first record includes one or more data entries;
   appending a new data entry to the first record, wherein the first record is transitioned to a second record upon being appended with the new data entry, and wherein the second record includes life history of the tape;
   unmounting the tape from the tape drive; and
   mounting the tape into a new tape drive of a new tape storage subsystem.

8. The system of claim 7, wherein determining whether the first record of the tape exists in the tape storage subsystem comprises:
   identifying that the first record does exist in the tape storage subsystem; and
   generating the new data entry, wherein the new data entry is populated with vital data, wherein the vital data includes the volume statistical information and the performance information of the tape during the mounting of the tape.

9. The system of claim 8, wherein the operations further comprise:
   sending the second record with an associated unique identifier to the tape storage subsystem;
   deleting the first record from the tape storage subsystem;
   recording the second record in place of the first record in the tape storage subsystem;
   generating, by the tape storage subsystem, a health report of the tape cartridge; and
   displaying the health report to a user.

10. The system of claim 9, wherein the operations further comprise:
    maintaining the first record in the RAM of the tape drive;
    identifying that the tape has been remounted;

accessing the first record from the RAM of the tape drive and the second record from the tape storage subsystem;

replacing the first record in the RAM of the tape drive with the second record; and replacing the second record in the tape storage subsystem with a third record, wherein the third record is the second record appended with vital data associated with the remount.

11. The system of claim 7, wherein determining whether the first record of the tape exists in the tape storage subsystem comprises:

identifying that the first record does not exist in the tape storage subsystem; and generating the first record with the new data entry, wherein the new data entry is populated with vital data, wherein the vital data includes the volume statistical information and the performance information of the tape during the mounting of the tape.

12. The system of claim 11, wherein the operations further comprise:

sending the first record with an associated unique identifier to the tape storage subsystem;

recording the first record in the tape storage subsystem;

generating, by the tape storage subsystem, a health report of the tape cartridge; and displaying the health report to a user.

13. A computer program product comprising a computer readable storage medium having program instructions embodied therewith, the program instructions executable by a processor to cause the processor to perform a function, the function comprising:

mounting the tape into a tape drive, wherein mounting the tape into the tape drive includes loading the tape from a storage slot;

requesting, by the tape drive, a first record of the tape from the tape storage subsystem;

determining whether the first record of the tape exists in the tape storage subsystem;

loading the first record of the tape in random access memory (RAM) of the tape drive, wherein the first record includes one or more data entries;

appending a new data entry to the first record, wherein the first record is transitioned to a second record upon being appended with the new data entry, and wherein the second record includes life history of the tape;

unmounting the tape from the tape drive; and mounting the tape into a new tape drive of a new tape storage subsystem.

14. The computer program product of claim 13, wherein determining whether the first record of the tape exists in the tape storage subsystem comprises:

identifying that the first record does exist in the tape storage subsystem; and generating the new data entry, wherein the new data entry is populated with vital data, wherein the vital data includes the volume statistical information and the performance information of the tape during the mounting of the tape.

15. The computer program product of claim 14, further comprising:

sending the second record with an associated unique identifier to the tape storage subsystem;

deleting the first record from the tape storage subsystem;

recording the second record in place of the first record in the tape storage subsystem;

generating, by the tape storage subsystem, a health report of the tape cartridge; and displaying the health report to a user.

16. The computer program product of claim 15, further comprising:

maintaining the first record in the RAM of the tape drive;

identifying that the tape has been remounted;

accessing the first record from the RAM of the tape drive and the second record from the tape storage subsystem;

replacing the first record in the RAM of the tape drive with the second record; and replacing the second record in the tape storage subsystem with a third record, wherein the third record is the second record appended with vital data associated with the remount.

17. The computer program product of claim 13, wherein determining whether the first record of the tape exists in the tape storage subsystem comprises:

identifying that the first record does not exist in the tape storage subsystem; and generating the first record with the new data entry, wherein the new data entry is populated with vital data, wherein the vital data includes the volume statistical information and the performance information of the tape during the mounting of the tape.

18. The computer program product of claim 17, further comprising:

sending the first record with an associated unique identifier to the tape storage subsystem;

recording the first record in the tape storage subsystem;

generating, by the tape storage subsystem, a health report of the tape cartridge; and displaying the health report to a user.

* * * * *